United States Patent
Knowles et al.

(10) Patent No.: US 11,714,176 B1
(45) Date of Patent: Aug. 1, 2023

(54) HELICAL ACOUSTIC LIQUID LEVEL SENSOR

(71) Applicant: Texzec, Inc., Round Rock, TX (US)

(72) Inventors: Terence John Knowles, Austin, TX (US); Charles F Bremigan, III, Jarrell, TX (US)

(73) Assignee: Texzec, Inc., Round Rock, TX (US)

( * ) Notice: Subject to any disclaimer, the term of this patent is extended or adjusted under 35 U.S.C. 154(b) by 0 days.

(21) Appl. No.: 17/934,947

(22) Filed: Sep. 23, 2022

(51) Int. Cl.
*G01S 7/521* (2006.01)
*G01F 23/2962* (2022.01)
*G01F 23/00* (2022.01)

(52) U.S. Cl.
CPC .......... *G01S 7/521* (2013.01); *G01F 23/0046* (2013.01); *G01F 23/2962* (2013.01); *G01N 2291/011* (2013.01); *G01N 2291/02836* (2013.01)

(58) Field of Classification Search
CPC .. G01S 7/521; G01F 23/0046; G01F 23/2962; G01N 2291/011; G01N 2291/02836
See application file for complete search history.

(56) References Cited

U.S. PATENT DOCUMENTS

| | | | | |
|---|---|---|---|---|
| 3,113,456 A | * | 12/1963 | Smith, Jr. | ........... G01F 23/2962 367/908 |
| 5,329,070 A | | 7/1994 | Knowles | |
| 5,819,582 A | * | 10/1998 | Kelly | ..................... G01R 27/06 73/290 R |
| 8,919,193 B2 | | 12/2014 | Knowles | |
| 9,880,044 B2 | | 6/2018 | Knowles | |
| 10,551,238 B2 | | 2/2020 | Knowles | |
| 2007/0204689 A1 | * | 9/2007 | Bostrom | ............ G01F 23/2962 73/290 V |
| 2009/0183564 A1 | * | 7/2009 | Kotz | ................... G01F 23/2961 73/290 V |
| 2009/0312965 A1 | | 12/2009 | Knowles | |
| 2013/0091946 A1 | | 4/2013 | Knowles | |
| 2020/0276612 A1 | * | 9/2020 | Glitsch | ................... G01S 7/521 |
| 2022/0291171 A1 | * | 9/2022 | Balasubramanian | .. G01N 29/07 |

* cited by examiner

*Primary Examiner* — David Z Huang
*Assistant Examiner* — Jean F Morello
(74) *Attorney, Agent, or Firm* — Patents and Licensing LLC; Daniel W Juffernbruch

(57) ABSTRACT

An ultrasonic sensor detects a level of a fluid. A first probe has a first transducer element to transmit an ultrasonic signal through the first probe. A second probe of a helix shape has a second transducer element coiled around the first probe to receive the ultrasonic signal transmitted by the first probe through the fluid. A stabilizing rod and a plurality of stabilizing collets are disposed between the rod and the second probe parallel to both the first probe and the second probe.

19 Claims, 8 Drawing Sheets

HELICAL ACOUSTIC LIQUID LEVEL SENSOR

BACKGROUND OF THE INVENTIONS

1. Technical Field

The present inventions relate to acoustic sensors and, more particularly, relate to helical sensors for acoustically sensing a liquid level.

2. Description of the Related Art

The ultrasonic liquid level sensor of U.S. Pat. No. 8,919,193 by Knowles has limitations due to acoustic feedthrough of its helix. These limitations cause errors in liquid level readings due to acoustic feedthrough and restricted sensor length due to helix motion.

What is needed is an improved helical liquid level sensor.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

A helical acoustic type of liquid level sensor operates by sending a burst of ultrasonic waves via a transducer along a vertical sending rod. The waves in the rod cause compressional waves to propagate in a liquid but at a high enough frequency that propagation in air is attenuated enough to be ignored. A receiving rod wound in the shape of a helix surrounds the sending rod and compressional waves in the liquid cause elastic waves in the helix which then travel to a receiving transducer. In effect the sending rod is acoustically coupled to the helix via a liquid.

The first waves to appear at the receiving transducer are generated at the liquid surface and hence the time from generating the burst of waves until reception of the start of the wave burst by the receive transducer is linearly dependent on liquid level. The purpose of the helix is to increase the time difference due to a change in liquid level and so increase liquid level resolution.

In order to accurately determine level, the receive burst must be detected as early as possible, which implies that the signal to noise ratio must be as high as possible given cost and response time constraints.

A cause of inaccuracies in the sensor of U.S. Pat. No. 8,919,193 was due to acoustic wave feedthrough appearing at the receive transducer ahead of the start of the receive wave response, and indistinguishable from it. The feedthrough was principally found to originate in acoustic coupling in the top plate through which the rods pass. The top plate is necessary to provide structural rigidity and seals the transducer and associated electronics from the liquid. The helix itself can be subject to vibration and excessive motion that increase with length and limited the helix to a length of 10 inches. Thus there is a need to stabilize the helix without creating acoustic feedthrough paths and to design the top plate with minimum acoustic coupling between the sending or source waves and the receive transducer.

We will disclose that this has been accomplished through the employment of helix stabilizing rods with reduced acoustic coupling to the helix by limiting contact area between the rods and the helix and by providing acoustic attenuation in possible feedthrough paths.

To reduce acoustic coupling in the top plate the plate has been formed to reduce contact area and enhance acoustic attenuation between the source and receive elements. We will also disclose a top plate that provides welded acoustic passthroughs for the center rod and helix for operation with liquids that attack elastomer polymers used in O-rings.

Figure 1:
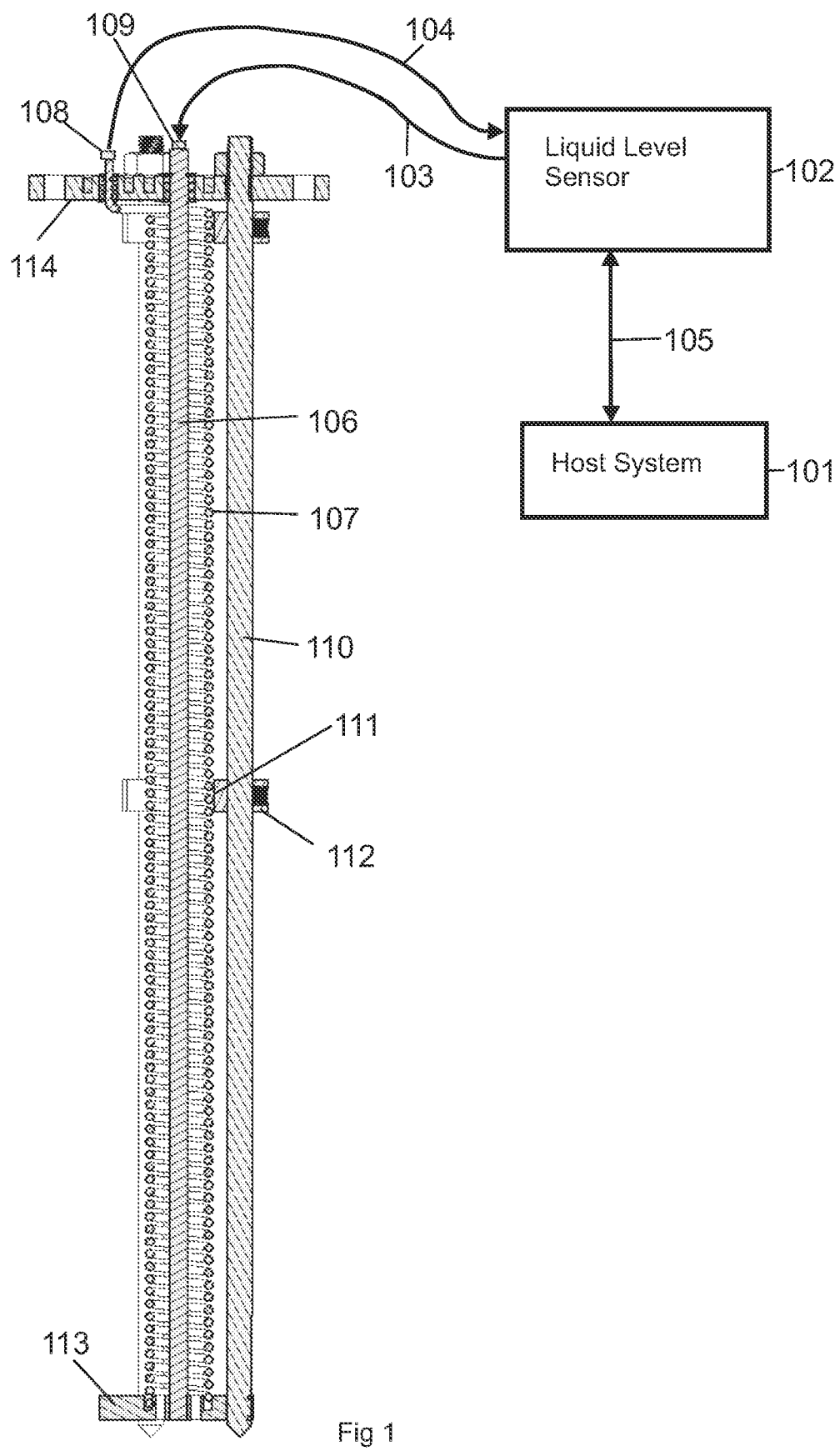
FIG. 1 illustrates a sectional side view of an acoustic helical sensor together with a schematic diagram of a control unit and a host system for sensing a liquid level according to embodiments of the present inventions.

FIG. 1 illustrates a sectional side view of an acoustic helical sensor together with a schematic diagram of a control unit and a host system for sensing a liquid level according to embodiments of the present inventions.

FIG. 1 of the present invention embodies a transmit transducer 109 bonded to the center rod 106. A receive transducer 108 is bonded to a helix 107. The helix is restrained in place by three stabilizing rods 110 and three stabilizing collars 112. Each of the three stabilizing collars 112 has a knife edge 111 pointed to touch an outside surface of the helix 107 at one or more turns of the helix 107. The center rod 106 and stabilizing rods 110 are held in position by the top plate 114 and the bottom plate 113. The liquid level sensor electronic control unit 102 transmits the RF signal to transducer 109 through cable 103. The liquid level sensor electronic control unit 102 receives the RF signal from the receive transducer 108 through cable 104. The liquid level sensor electronic control unit 102 communicates the liquid level information the host system 101 via cable 105. The center rod 106 can have a prismatic shape.

Figures 2, 3:
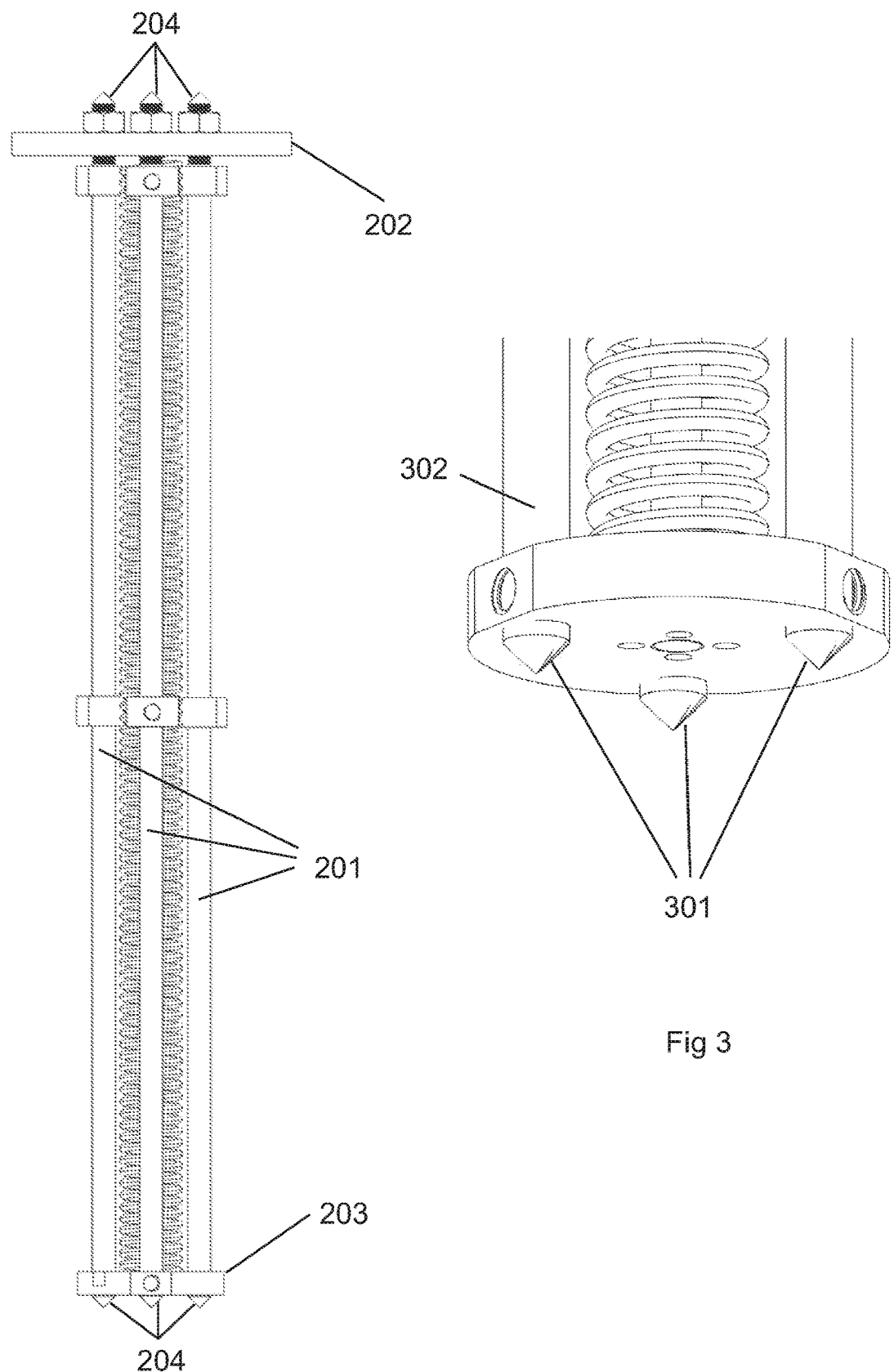
FIG. 2 illustrates a side view of an acoustic helical sensor according to embodiments of the present inventions.
FIG. 3 illustrates an isometric view of a lower portion of the acoustic helical sensor of FIG. 2 according to embodiments of the present inventions.

FIG. 2 illustrates a side view of an acoustic helical sensor according to embodiments of the present inventions.

FIG. 3 illustrates an isometric view of a lower portion of the acoustic helical sensor of FIG. 2 according to embodiments of the present inventions.

When the length of the sensor exceeds ten or more inches, it is important to provide an approach to restrain the helix from excessive movement. One approach is to restrain the helix by at least three stabilizing rods 201 fixed to the top end plate 202 as shown in FIG. 2. The rods are connected to the top end plate 202 and at the bottom end plate 203. In FIG. 2, the stabilizing rods 201 are mounted to the top and bottom end plates 202, 203 and fix the helix in position. The stabilizing rods 201 are connected at the top and the bottom of the sensor as shown and provide a rigid frame restricting motion and vibration of the helix due to fluid motion or vibration.

Stabilizer rods 110, 201, 302 if not modified with a conical end shapes 204, 301 of FIGS. 2 and 3 can also be a source of spurious waves that can render the sensor inoperable. Waves originating from the center rod can acoustically couple to the stabilizing rods but the primary source was found to be waves that couple from the helix to the rods via the helix restraining element 112. These waves travel across the restraining element 112, upwards along the rods as shown as 103. They then couple to the receiving transducer bonded to the helix via a path that includes the top plate 204. These waves travel a shorter path than the waves traveling through the helix and appear ahead of and during the reception of the desired waves from the helix.

These spurious waves can interfere with the reception of the desired signal to the point where the sensor is inoperable. Waves originating from the center rod can acoustically couple to the stabilizing rods 201 as well as the helix. These spurious waves travel upwards and couple into the helix, ahead of and during reception of the desired signal, particularly its leading edge. It was also found helpful to form a conical shape 204, 301 of both ends 204, 301 of the stabilizing rods to reduce multiple reflections of waves that could potentially travel along the rods due to acoustic coupling. Although a conical shape is illustrated at both ends 204, 301 of the stabilizing rods 201, the conical shape can be provided at some but not all ends of the stabilizing rods 201 if spurious signals can be made minimal in other ways.

Coupling of these spurious waves is principally due to waves in the stabilizing rods that enter the top end plate 202 which is mechanically mounted to the rods for stability. These waves travel through the end plates 202 and 203 to the helix receive transducer during and ahead of the desired signal because the signal path length of these spurious waves is shorter than that of waves traveling in the helix.

Figure 4:
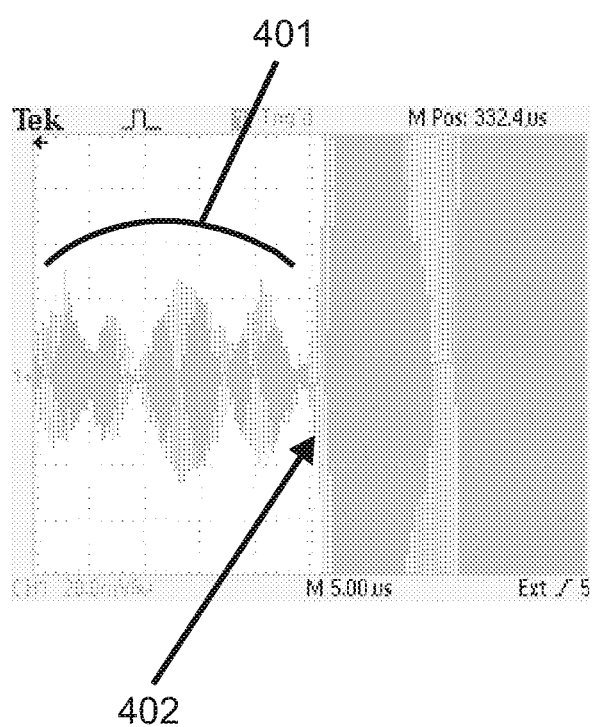
FIG. 4 illustrates a plot according to embodiments of the present inventions.

FIG. 4 illustrates a plot from oscilloscope image of the spurious waves 401 before and during the reception of a leading edge 402 of the desired signal. These can be large enough to cause serious inaccuracies in the determination of liquid level. Because of this effect, determining the presence and timing of the leading edge is subject to errors sufficient to render the sensor unusable. In FIG. 4 these spurious waves 401 are shown ahead of the leading edge. The leading edge 402 of the signal associated with the liquid level can be difficult if not impossible to detect with these spurious waves present. A successful method of reducing the effects of spurious waves due to acoustic feedthrough has been found and consists of restricting the contact area between the stabilizing elements of the stabilizing collars attached to the stabilizing rods, and the helix and by modifying the top plate to minimize acoustic coupling.

Figure 5:
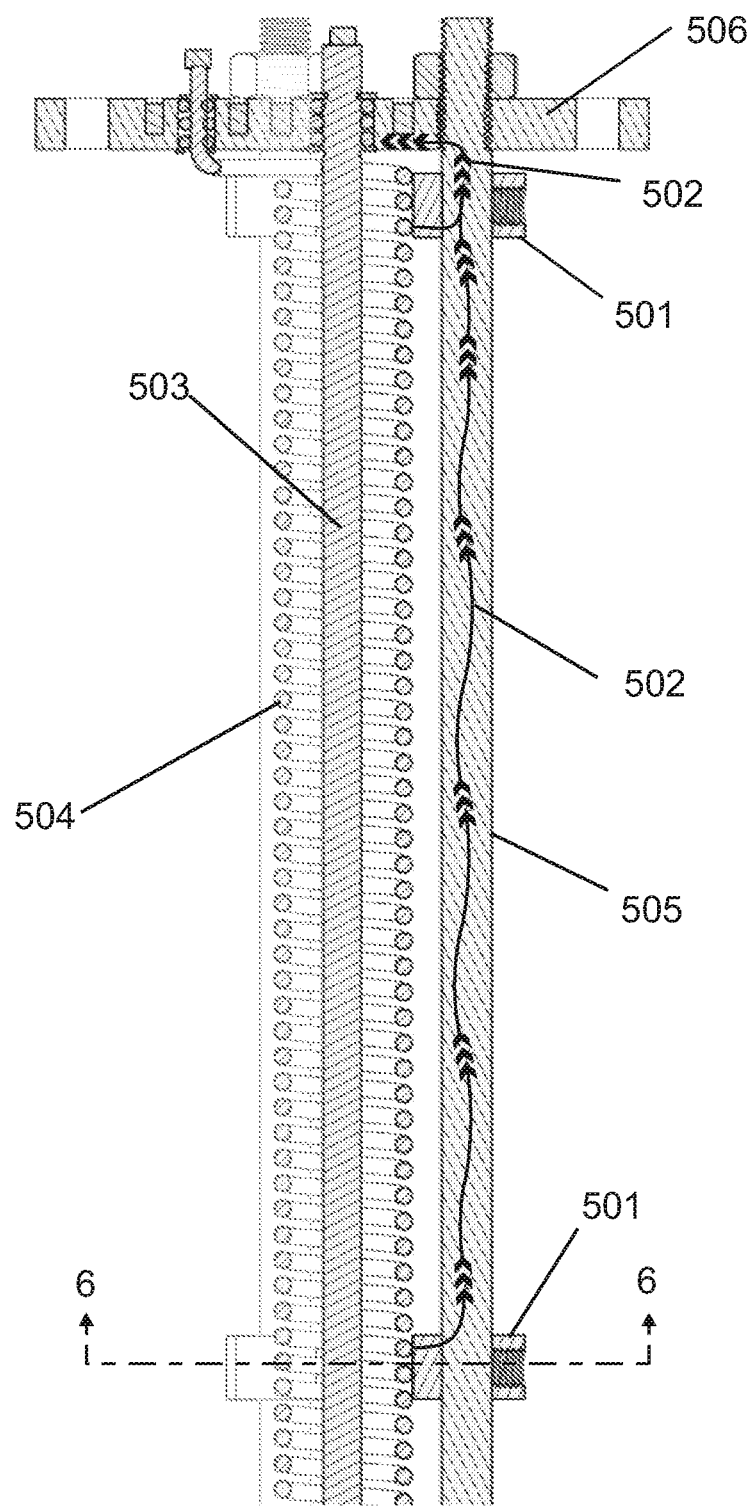
FIG. 5 illustrates a sectional side view of an upper portion of an acoustic helical sensor according to embodiments of the present inventions.

FIG. 5 illustrates a sectional side view of an upper portion of an acoustic helical sensor according to embodiments of the present inventions. A successful method for reducing spurious waves due to acoustic feedthrough from the restraining rods has been found. A helix element 504 and stabilizing rods 505 are secured to a top end plate 506. As shown in FIG. 5 contact between the helix 504 and the stabilizing rods 505 is reduced by restricting the number of contact points and shaping the contact points to have minimal surface area. Shaped collets 501 attached to the stabilizing rods 505 minimize the spurious waves 502, below a level which interferes with the signal sent by the center rod 503 through the liquid to the helix 504. The collets 501 can be secured to the stabilizing rods 505 using a fastener such as set screw or welded or press fit or bonded such as using glue. Collets 501 can be doughnut shaped or U-shaped. The stabilizing rods 505 can also have the collets 501 formed therein of the same integral material. The sending transducer of center rod 503 can be a compressional mode or a radial mode transducer.

Figure 6:
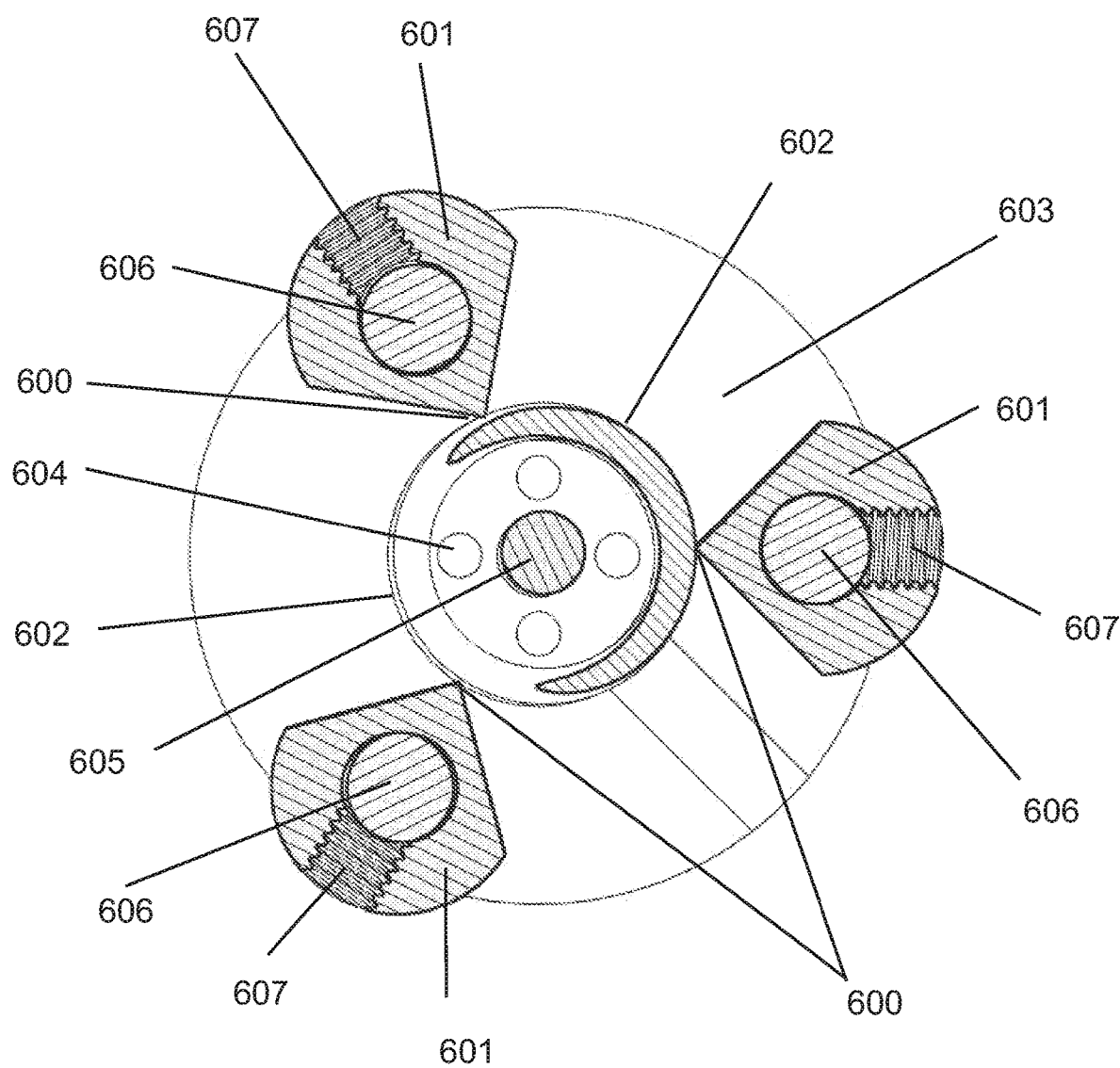
FIG. 6 illustrates a sectional view of the acoustic helical sensor of FIG. 5 according to embodiments of the present inventions.

FIG. 6 illustrates a sectional view of the acoustic helical sensor of FIG. 5 according to embodiments of the present inventions. As shown FIG. 6, in a sectional view, the bottom plate has drain holes 604, and the center rod 605 projects through the bottom end plate 603. The collets may be metal such as stainless steel or a material with low acoustic transmission such as nylon to further attenuate feedthrough. The collets can be mechanically attached to the stabilizing rod with a set screw 607 or by welding or bonding with an adhesive or formed from the stabilizing rod itself. The stabilizing rods 606 themselves may also be metal or any rigid material that highly attenuates ultrasonic acoustic waves such as a polyphenylenesulphide PPS material. These stabilizer rods shown in FIG. 3 (302), as circular in shape may also be formed in square or triangular shapes for example.

The purpose of eliminating acoustic feedthrough is to prevent acoustic waves from entering the helix other than those that originate from acoustic coupling between the center stabilizing rod and the helix via the liquid. Restricting direct coupling between the helix and the stabilizing rods is necessary but insufficient. Acoustic waves will still be present in the stabilizing rods because of coupling between the center rod and the stabilizing rods via the liquid. Designing the top plate to reduce waves in the stabilizing rods from entering the helix via the top plate is also essential.

Figure 7:
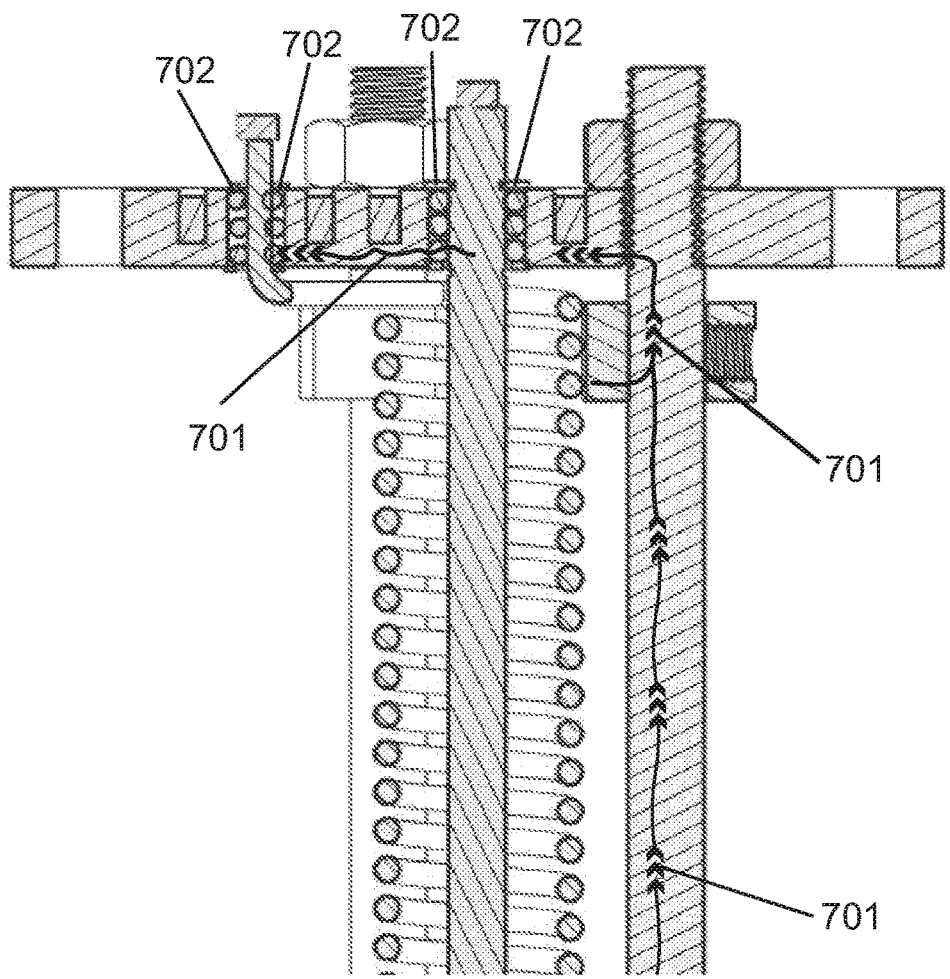
FIG. 7 illustrates a sectional side view of an upper portion of the acoustic helical sensor of FIG. 5 according to embodiments of the present inventions.

FIG. 7 illustrates a sectional side view of an upper portion of the acoustic helical sensor of FIG. 5 according to embodiments of the present inventions. A further source of spurious waves due to feedthrough is shown in FIG. 7. Here spurious waves 701 from the center and also from the stabilizing rods couple to the helix through the mounting plate. The coupling can be reduced through the use of O-rings 702, however this was still found to be resolution limiting.

Figure 8:
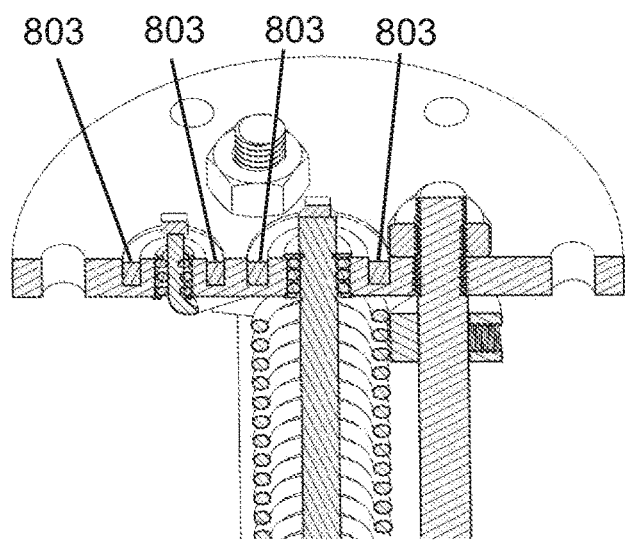
FIG. 8 illustrates a sectional perspective view of an upper portion of the acoustic helical sensor of FIG. 5 according to embodiments of the present inventions.

FIG. 8 illustrates a sectional perspective view of an upper portion of the acoustic helical sensor of FIG. 5 according to embodiments of the present inventions. Moats 803 are formed around the area where the various rods pass through or connect with the plate was shown to reduce spurious waves to a level where resolution was not affected by spurious waves due to by acoustic feedthrough. As an example a 290 mil thick plate was machined down to 40 or 50 mils remaining. The moat is then filled with an acoustic wave absorbing epoxy. The combination of a top plate modified with acoustic absorbing epoxy filled moats together with minimal contact area helix restraining collets were shown to be sufficient to reduce acoustic feedthrough to minimal levels.

The stabilizing rods can be round, square or triangular stabilizing rods according to embodiments of the present inventions. In addition, hexagonal, pentagonal, octagonal and oval shapes could be used also. FIG. 6 illustrates the embodiment of a round stabling rod 606 each having a round cross-section as illustrated.

The sensor can use compressional type transducers and operates with longitudinal and flexural modes propagating in the center rod and helix. The frequency of operation must be great enough that propagation of waves in air between the center rod and helix are negligible otherwise spurious waves due to air coupling will render the sensor unusable. Operational frequencies can vary depending on the application between 150 KHz to greater than 2 MHz.

It was found necessary to reduce acoustic feedthrough found in the original helical sensor and to restrict movement of the helix through the following 1-4.

1. Reduce acoustic coupling between the center rod, helix and stabilizing rods by machining moats around the center rod and helix feedthroughs and filling the moats with acoustic absorbing material.
2. Add stabilizing members to restrict helix motion.
3. Add collets to the stabilizing members shaped to minimize surface contact area to reduce acoustic contact.
4. Reduce multiple reflections in the center rod and stabilizing members by shaping the ends of the rod and members to reduce acoustic reflections.

The stabilizing rod, top plate and the stabilizing collets can be constructed from plastic materials such as nylon as well as metal. The choice depends on the type of fluid in which the sensor is immersed.

Ultrasonic Feed Through Isolation Channel Moat

This is a feature that is machined into the top plate of the helical liquid level sensor. The top plate mechanically locates the sensor center rod, helix and the restraining stabilizing members. This common mechanical attachment of the sensor components permits the transmission of spurious signals through the top plate. These spurious signal, if left unchecked reduce the liquid sensing resolution and linearity. These spurious signals are dampened by machining an isolation channel in the top plate. The channels are located around the opening in the plate where the center rod and helix are attached. The channel can be circular in shape but other shapes are effective. The channel width should be at least 3 mm in width to as wide as 5 mm if mechanically possible within the top plate geometries. The channel depth should be 80% of the thickness of the top plate in the area where the channel is machined. After machining the channel an acoustic wave absorbing polymer is placed into the channel and cured further enhancing the spurious signal attenuation.

Polymer Absorber for Helical Type Sensor

The following polymers can be used to help dampen any spurious ultrasonic signals when placed into the isolation channel features of the top plate of the helical liquid level sensor. The polymer can be epoxy, urethane, polyurethane. The polymer can cure using a variety of methods; chemical reaction when 2 parts are mixed, when an activator contacts the polymer, visible light, UV light, heat or presence of moisture. A commercially available polymer may have suitable ultrasonic attenuation based on testing. If needed the addition of a filler material to the polymer can be added to enhance the attenuation. Filler material can be one or a mixture of materials; ceramic, glass or metal powders.

Additional properties of the polymer are: The formulation must be capable of stability over the operation temperature range of the sensor. The formulation must have resistance to chemicals present in its operating environment.

In the helical liquid level sensor an elastomer seal O-ring is used where the helix and center rod pass through the top housing. The elastomer seal has 2 functions. First, to provide a seal between the inside and the outside of the liquid vessel. Second, to provide isolation of the center rod or the helix from the top plate, minimizing acoustic cross talk that can travel through the top plate.

The elastomeric seal method does have one drawback, compatibility of the elastomer with the liquid contained in the tank. For many applications the elastomer can be selected to resist the liquid or its vapors present in the tank. For some liquids or its vapor, even robust elastomers are not capable of long term exposure without failure.

Top plates are necessary to shield the electronics from the liquid and for mechanical stability of the sensor because they provide rigidity to the structure. The center rod and the helix pass through the top plate via elastomeric O-rings in past and current embodiments of this sensor because this was the only means to ensure rigidity without excessive acoustic losses and acoustic feedthrough. The elastomer acts to acoustically decouple the center rod and helix from the upper plate. This method is practical because most liquids do not attack the elastomeric polymers of which the O-rings are constituted. For those liquids that do degrade the O-rings a solution to overcome this limitation of the incompatible liquids and elastomers is to weld the center rod and helix to the top plate and provide a stainless steel surface. To do so several challenges had to be overcome. First, welds unlike elastomers can efficiently acoustically couple the center rod and helix to the upper plate. This results in the transmission of acoustic energy from the center rod and helix into the top plate. This should be minimized as this loss of energy into the top plate is a loss of acoustic energy that would normally be available to sense the liquid level. Second, the transmission of acoustic energy through the weld into the top plate can easily cause cross talk from the center rod to the helix. This cross talk causes acoustic interference creating difficulties in obtaining an accurate liquid level reading.

Figure 9:
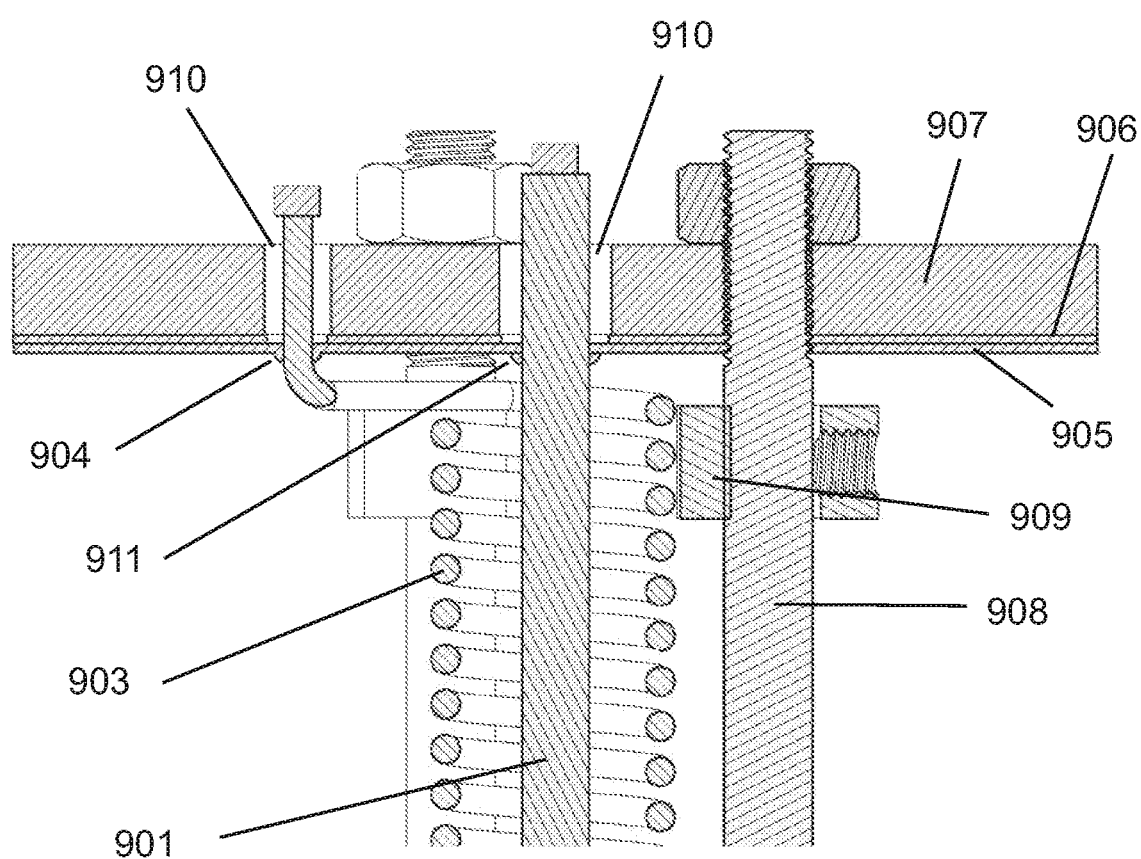
FIG. 9 illustrates a sectional side view of an upper portion of an acoustic helical sensor having a layered end plate according to embodiments of the present inventions.

FIG. 9 illustrates a sectional side view of an upper portion of an acoustic helical sensor having a layered end plate according to embodiments of the present inventions. An approach to reduce at least the two issues listed above is the use of a laminated end plate assembly. FIG. 9 illustrates the center rod 901 welded to a thin, essentially laminar top end plate 905. This plate and the welded joint 911 are preferably sufficiently thin, that acoustic losses are minimized. The helix 903 is welded 904 to the thin laminar top end plate 905. The thin plate is then bonded with an adhesive bonding layer 906 to a polymer plate 907 to provide additional structural rigidity for the helix stabilizing rod 908 and the helix position spacer 909. The polymer plate has a larger diameter opening where the center rod and helix pass through providing an air gap for acoustic isolation 910. The polymer plate 907 and the adhesive bonding layer 906 also attenuate acoustic crosstalk that is transmitted through the laminar top end plate 905. In essence the stainless steel laminar provides a surface to the liquid and a weldable surface for the center rod and helix. Mechanical strength is provided by the layers above the laminar.

Figure 10:
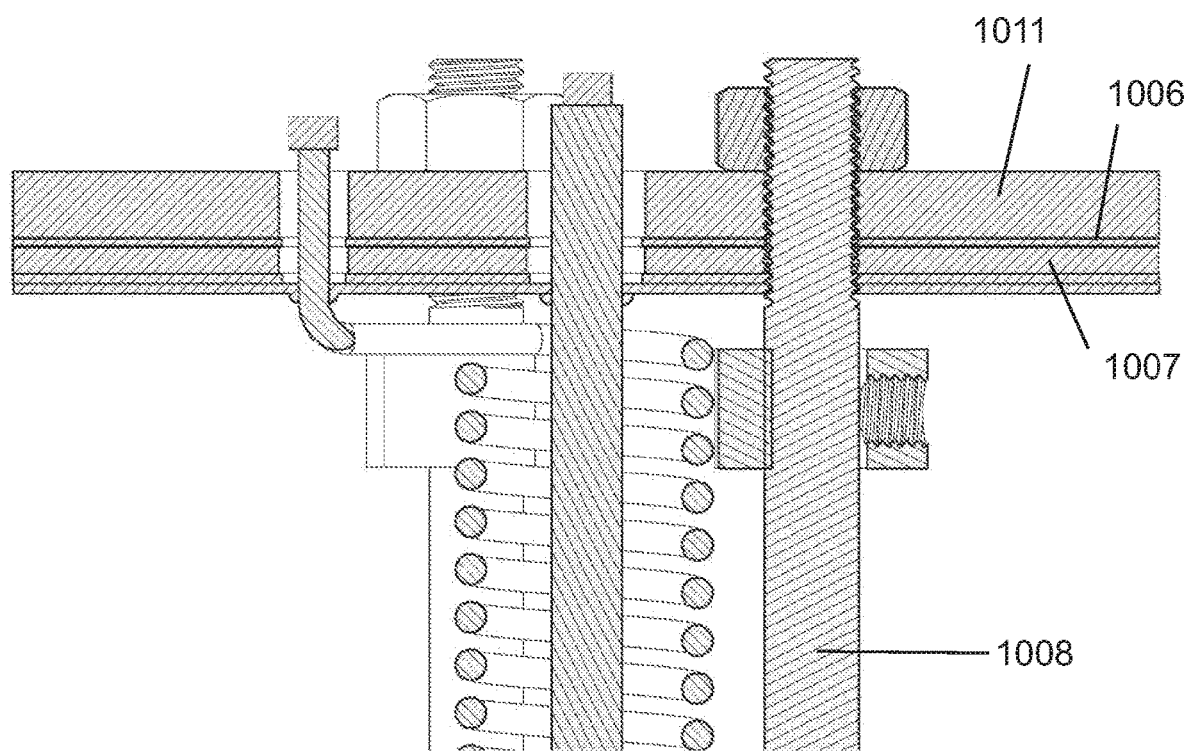
FIG. 10 illustrates a sectional side view of an upper portion of an acoustic helical sensor having a layered end plate according to embodiments of the present inventions.

FIG. 10 illustrates a sectional side view of an upper portion of an acoustic helical sensor having a layered end plate according to embodiments of the present inventions. For applications requiring additional rigidity, such as where the sensor mounts to a tank, the addition of a metal plate to the top of the assembly described above may be required. In FIG. 10, to accommodate the metal plate 1011, the polymer layer 1007 described above is reduced in thickness with the metal plate bonded to the top of the polymer plate with an adhesive layer 1006. The addition of the metal plate increases structural rigidity providing a stable mounting for stabilizing rods 1008 and liquid tanks under pressure.

Any letter designations such as a or b etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

The abstract and the title are provided to comply with the rules requiring an abstract and a title that will allow a searcher or other reader to quickly ascertain the subject matter of the technical disclosure. It is submitted with the understanding that they will not be used to interpret or limit the scope or meaning of the claims. 37 CFR 1.72(b).

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An ultrasonic sensor for detecting a level of a fluid surrounding the ultrasonic sensor, the ultrasonic sensor comprising:
    a first probe having a first transducer element, the first transducer element configured to transmit an ultrasonic signal through the first probe;
    a second probe of other than a straight shape, the second probe having a second transducer element, the second transducer element configured to receive the ultrasonic signal transmitted by the first probe through the fluid; and
    a stabilizing element attached to the second probe.

2. The ultrasonic sensor of claim 1, wherein the stabilizing element comprises a stabilizing rod and a plurality of stabilizing members disposed parallel to both the first probe and the second probe.

3. The ultrasonic sensor of claim 1, wherein the stabilizing element comprises a stabilizing rod and a plurality of stabilizing members disposed between the stabilizing rod and the second probe along a length thereof.

4. The ultrasonic sensor of claim 3, wherein each of the plurality of stabilizing members are pointed towards the second probe to minimize contact with the second probe.

5. The ultrasonic sensor of claim 3, wherein each of the plurality of stabilizing members comprise a collet secured to the stabilizing member.

6. The ultrasonic sensor of claim 5, wherein the stabilizing rod has a circular cross section sized to fit within the collet of each of the plurality of stabilizing members.

7. The ultrasonic sensor of claim 5, wherein the stabilizing rod has a triangular cross section sized to fit within the collet of each of the plurality of stabilizing members.

8. The ultrasonic sensor of claim 5, wherein the stabilizing rod has a square cross section sized to fit within the collet of each of the plurality of stabilizing members.

9. The ultrasonic sensor of claim 3, wherein the stabilizing rod has a conical shape on an end thereof.

10. The ultrasonic sensor of claim 1, wherein the stabilizing members are a plastic material.

11. The ultrasonic sensor of claim 1, wherein the first transducer element has an essentially straight shape.

12. The ultrasonic sensor of claim 1, wherein the other than straight shape of the second probe is a helix shape.

13. The ultrasonic sensor of claim 1, wherein the second probe has a shape coiled around the first probe.

14. The ultrasonic sensor of claim 1, wherein the stabilizing element comprises a plurality of stabilizing rods and each stabilizing rod has a plurality of stabilizing members pointed towards the second probe to minimize contact with the second probe.

15. The ultrasonic sensor of claim 1, further comprising a bottom plate secured near bottom ends of the plurality of rods, wherein each of the stabilizing rods extends beyond a bottom surface of the bottom plate and has a conical shape on an end thereof.

16. The ultrasonic sensor of claim 1, wherein each of the first probe, the second probe, and the stabilizing element have ends secured to an end plate.

17. The ultrasonic sensor of claim 16,
    wherein at least the end plate comprises moats; and
    wherein the stabilizing element comprises a plurality of rods, each of the plurality of stabilizing rods having ends secured to the end plate by an acoustic absorbing material filled into the moats each in contact with as associated end of one of the plurality of rods.

18. The ultrasonic sensor of claim 16,
    wherein the end plate is a layered end plate;
    wherein the first probe is a center rod welded to the end plate; and
    wherein the second probe is a helix welded to the end plate.

19. The ultrasonic sensor of claim 18,
    wherein the layered end plate is laminated with adhesive bonded to a polymer plate; and
    wherein the polymer plate has an opening where the center rod and helix pass through providing an air gap for acoustic isolation.

* * * * *